United States Patent

[11] 3,633,279

[72] Inventors James D. Frazier;
John F. Randolph, Jr., both of Lima, Ohio
[21] Appl. No. 30,227
[22] Filed Apr. 20, 1970
[45] Patented Jan. 11, 1972
[73] Assignee National-Standard Company
Niles, Mich.

[54] TIRE-MEASURING APPARATUS
11 Claims, 7 Drawing Figs.

[52] U.S. Cl. .................................................. 33/174 R,
33/143 D, 33/169 R, 33/175
[51] Int. Cl. .................................................. G03b 1/64
[50] Field of Search .......................................... 33/169 R,
172 R, 143 D, 176, 174 R, 175

[56] References Cited
UNITED STATES PATENTS

| | | | |
|---|---|---|---|
| 833,124 | 10/1906 | Cottrell ........................ | 33/169 R |
| 1,797,389 | 3/1931 | Woock ......................... | 33/143 D UX |
| 2,636,277 | 4/1953 | Hawkinson ................... | 33/143 D |
| 3,007,251 | 11/1961 | Rawls ........................... | 33/143 D X |

Primary Examiner—William D. Martin, Jr.
Attorney—Johnson, Dienner, Emrich, Verbeck & Wagner ABSTRACT: Apparatus for measuring the tire parameters of a tire carcass supported on a drum including a sensor member disposed above the drum and movable up and down toward the drum by a carriage unit. A length of chain extends from one side of the drum about a chain sprocket carried on the lower end of the sensor member to the carriage unit where its end is coupled to a slack takeup device. When the carriage unit is moved downwardly until the sensor member engages the tire carcass, the chain is displaced by virtue of its engagement with the tire carcass and this displacement is measured by a measuring device carried by the carriage unit to indicate the bead-to-bead length of the tire carcass. Also, a second measuring device carried by the carriage unit measures the distance between the center of the drum and the point of engagement of the sensor member with the crown of the tire carcass to measure the outside diameter of the tire carcass.

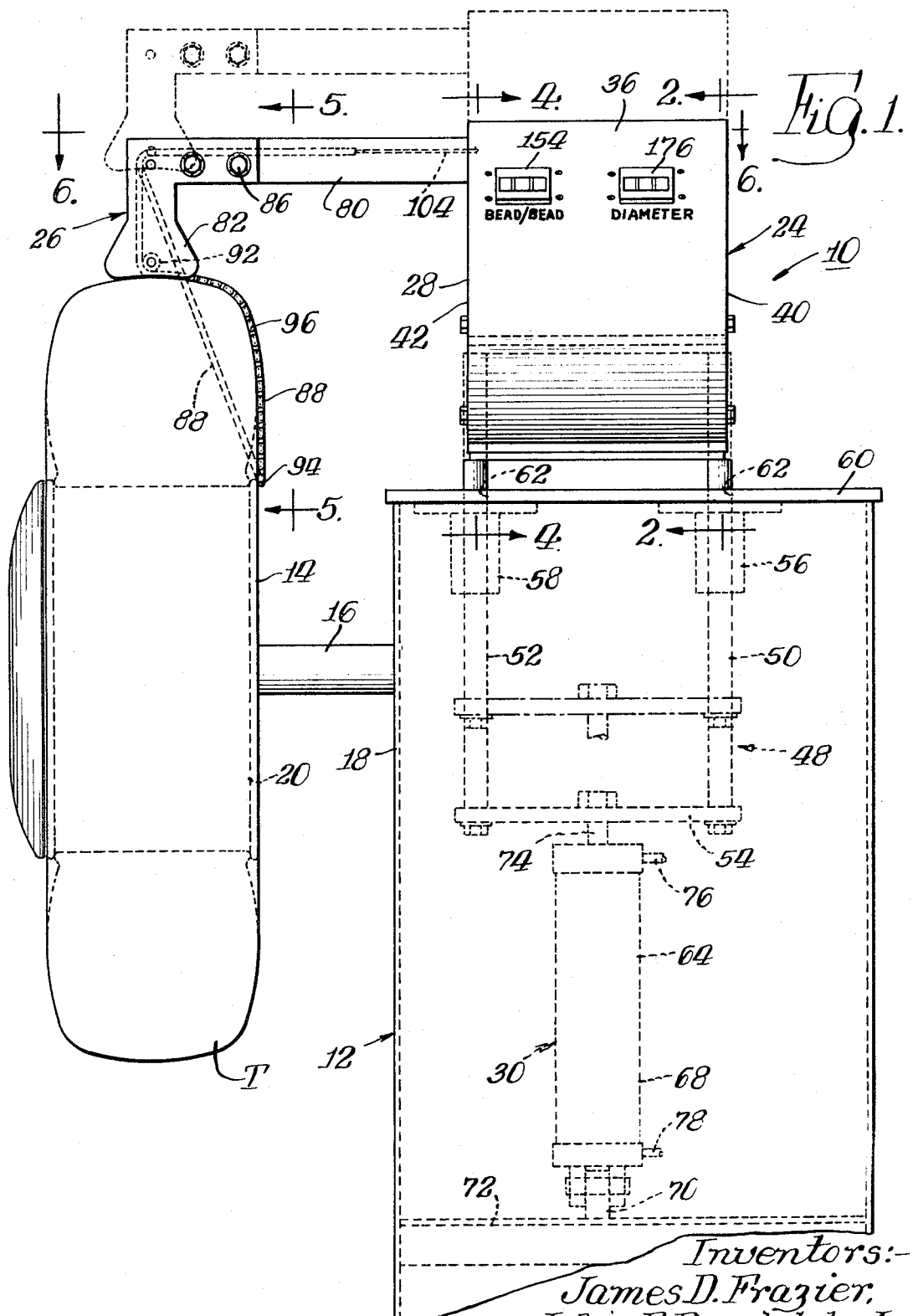

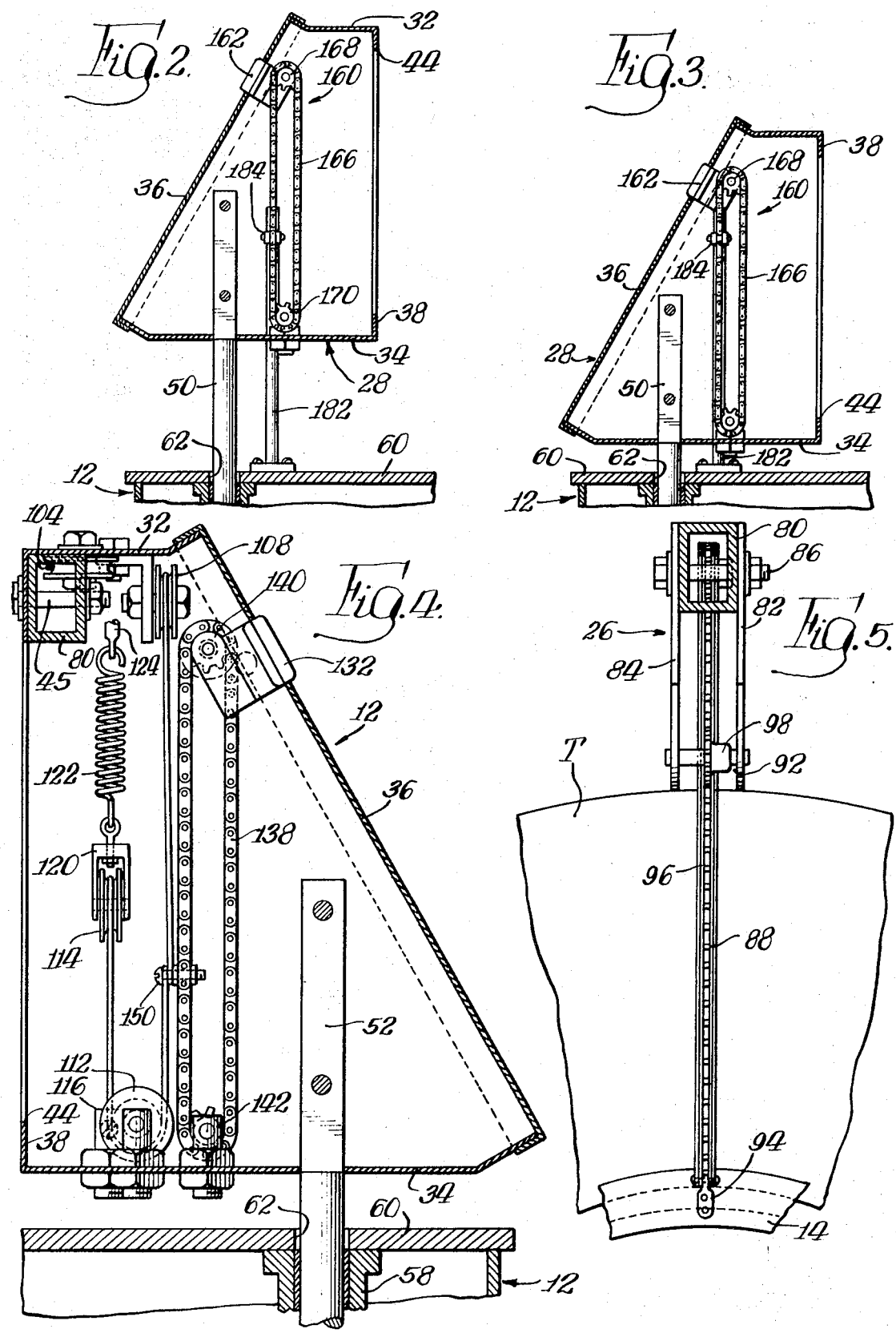

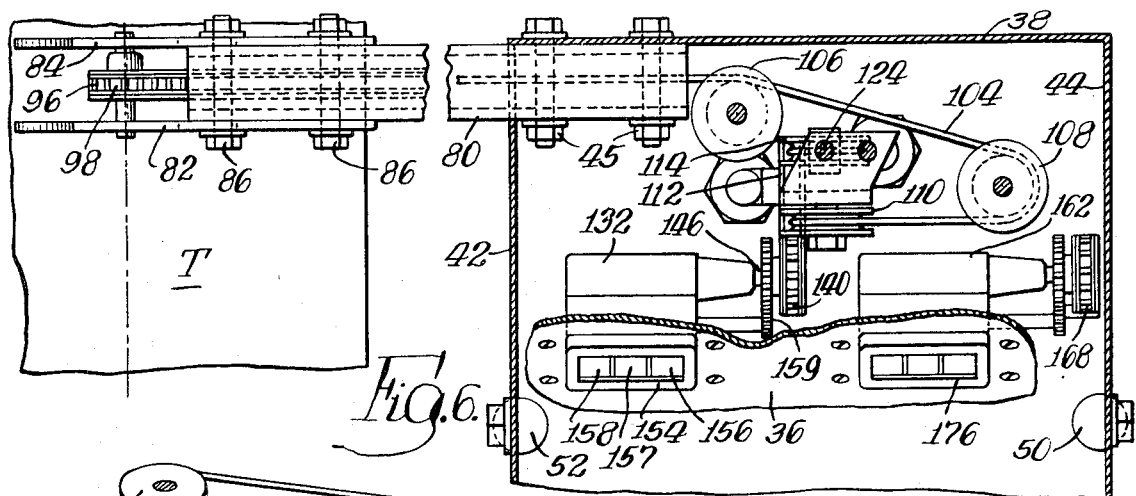
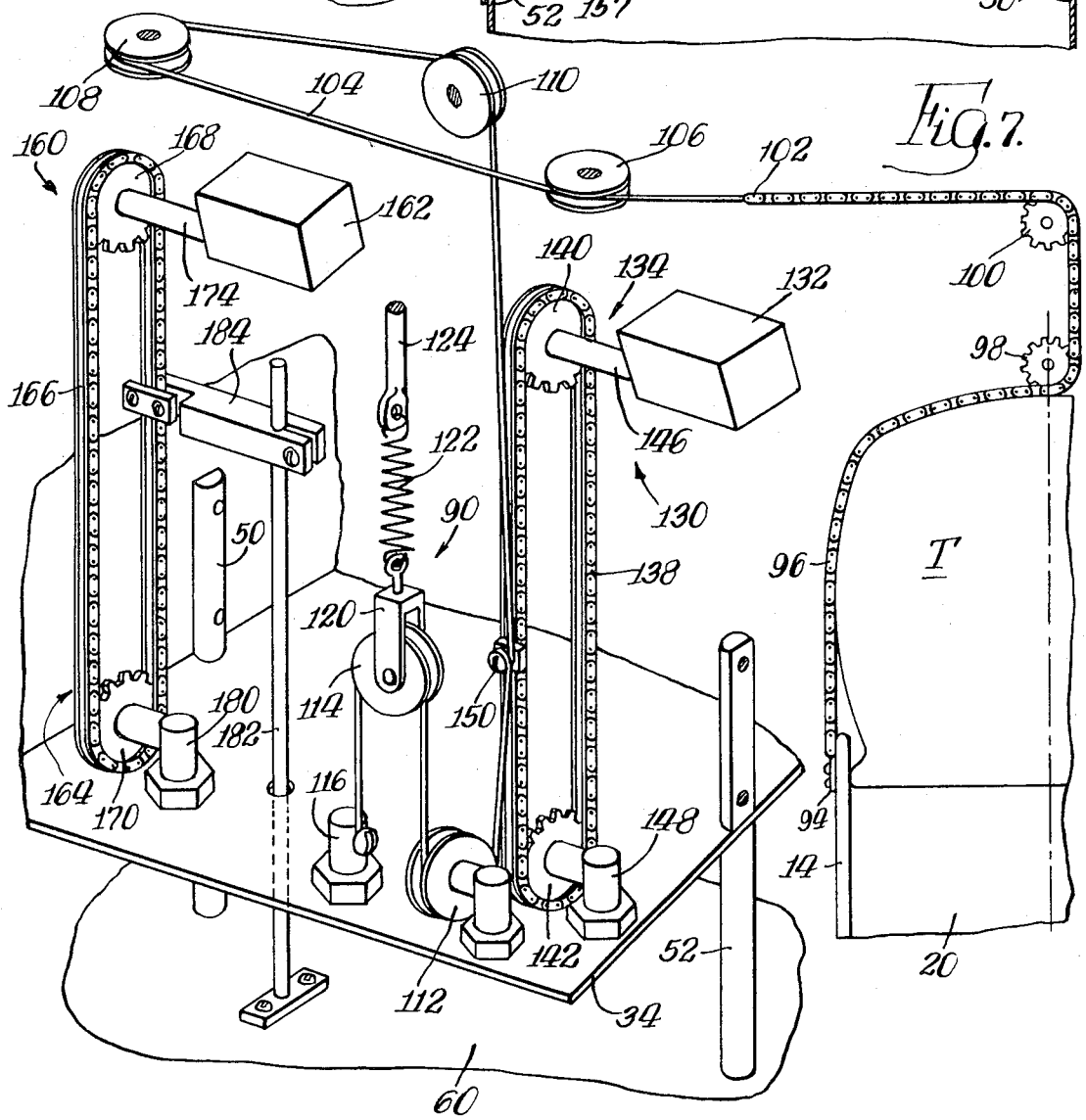

TIRE-MEASURING APPARATUS

BACKGROUND OF THE INVENTION

This invention relates to an apparatus for measuring certain dimensions of an annular object and, in particular, for measuring the bead-to-bead length and outside diameter of a tire carcass or casing.

Because of the large variety of tire sizes available, it is necessary to measure the bead-to-bead length and outside diameter dimensions in order to select the proper size tire building or rebuilding components, for example a tire mold. In the past, these measurements have been made by a person using a tape measure, which is a time-consuming operation and subject to the human error factor.

By virtue of this invention, it is possible to simultaneously make both measurements in a fraction of the time it previously took. The operator assembles the tire carcass on a drum and presses a start button. The tire carcass is instantaneously inflated and simultaneously a carriage unit is driven downward from a retracted position until a sensor member is brought into engagement with the crown of the tire carcass, at which time a bead-to-bead indicator and diameter indicator mounted on the carriage unit can be read to determine the desired dimensions. Afterwards, the carriage unit is lifted up to its retracted position and simultaneously the tire carcass is deflated so that it can be removed from the drum.

DESCRIPTION OF DRAWING

For a better understanding of this invention, reference may be had to the accompanying drawing, in which:

FIG. 1 is a front elevational view of the preferred embodiment of this invention;

FIG. 2 is a sectional view taken along line 2—2 of FIG. 1 and illustrates the indicating device for displaying the diameter dimension of a tire when in the retracted position;

FIG. 3 is an identical view to FIG. 2 with the components shown in the tire-gauging position, FIG. 4 is a sectional view taken along the line 4—4 of FIG. 1 and illustrates the indicating device for displaying the bead-to-bead dimension of a tire;

FIG. 5 is a sectional view taken along the line 5—5 of FIG. 1, showing the portion of the elongated compliant member between its fixed end of the drum and the sensor member;

FIG. 6 is a sectional view taken along the line 6—6 of FIG. 1; and

FIG. 7 is a perspective diagrammatic view of the tire-measuring apparatus of this invention.

DESCRIPTION OF PREFERRED EMBODIMENT

There is shown in FIG. 1, a tire-measuring apparatus embodying the principles of this invention and generally designated by the reference numeral 10. Tire-measuring apparatus 10 is supported on a pedestal or base 12.

A stationary drum 14 is supported by the pedestal 12 by means of a cylindrical rod 16 which extends horizontally from one of the sidewalls 18 of the pedestal 12. To accommodate a large range of tire sizes, the drum 14 uses a radially expandable and retractable chuck 20 to firmly support a tire carcass T. The chuck 20 could be of the type shown and described in US Pat. No. 2,960,130, dated Nov. 15, 1960 to J. A. Smyser. The tire carcass T may, for example, be a carcass from which the worn tread has been removed and which it is desired to retread. The tire carcass T is mounted on the chuck 20 in the collapsed position and thereafter the chuck 20 is radially expanded to firmly hold the tire carcass thereon. The tire carcass when mounted on the chuck may, as shown and described in the above-identified Smyser patent, be charged with air under pressure to permit an accurate measurement of the dimensions of the tire carcass T. The tire-measuring apparatus 10 of this invention includes a carriage assembly 24 which is adapted to move a sensor member 26 toward and away from the drum 14. The carriage assembly 24 includes a housing 28 which is reciprocally driven with respect to the pedestal 12 by means of a power-operated means 30 mounted within the pedestal 12.

The housing 28 has a top wall 32, a bottom wall 34, a slanting front wall 36, a vertical rear wall 38, and a pair of sidewalls 40 and 42. The rear wall 38 has an enlarged opening 44 to permit ready access to the parts contained therein. The housing 28 is supported on a carriage frame 48 comprising a pair of vertical guide posts 50 and 52 coupled together at their lower end by a crossbar 54 and mounted to the sidewalls 40 and 42, respectively, of the housing 28 at their upper ends. The pair of guideposts 50, 52 are guided along a vertical path by a pair of bearing members or bushings 56, and 58, respectively, which are secured to the under surface of a top wall 60 of the pedestal 18 beneath and in alignment with a pair of openings 62 formed therein.

The power-operated unit 30 comprises an air piston and cylinder device 64 having its cylinder 68 mounted at its lower end to a mounting stud 70 extending upwardly from crossbar 72 of pedestal 12. The piston rod 74 of the piston and cylinder device 64 is fastened at its upper end to the middle of the crossbar 54 of carriage frame 48. Upon actuation of the piston and cylinder device 64, the piston rod 74 is extended or retracted to reciprocally drive the carriage assembly 24. The piston and cylinder device 64 includes fluid connections at 76 and 78 providing for reciprocation of piston 74 in a known manner, in one direction or the other depending upon which of the fluid connections are under pressure or bleed.

The sensor member 26, which is carried by the carriage assembly 24 between a retracted position (indicated by the dotted lines in FIG. 1) and a measuring position (indicated by the solid lines in FIG. 1), comprises a horizontal rectangular tubular member 80 extending out of the sidewall 42 of housing 28 and is secured to the rear wall 44 by a nut and bolt arrangement 45 as shown in FIG. 6. Straddling the outer end of tubular member 80 is a pair of L-shaped plates 82 and 84 (see FIG. 5), which are fastened thereto by means of a pair of nut and bolt elements 86 (FIG. 6) threaded through aligned apertures in the rectangular tubing 80 and the plates 82, 84. The lower end of the pair of L-shaped plates 82, 84 have a curved surface which generally conforms to the shape of the crown portion of a tire carcass T.

For purposes of measuring the bead-to-bead length of tire carcass T, an elongated compliant member 88 is provided having one end fixed to one side of the drum 14 and its other end maintained under constant tension by a takeup device 90 (See FIG. 7). The compliant member 88 extends upwardly and laterally from its fixed end in a radial plane of drum 14 to a guide 92 which is disposed along a radial line bisecting the width of drum 14. To make an accurate bead-to-bead measurement, this geometrical arrangement between the fixed end of the drum and guide 92 is essential. In the preferred embodiment of this invention, the compliant member 88 is formed as a length of chain 96 and the guide 92 is formed as a chain sprocket 98 and is rotatably supported between the L-shaped plates 82, 84 at their lower ends.

The chain 96 extends upwardly from chain sprocket 98 and is trained about a second chain sprocket 100 from which it extends horizontally into the end of the square tubular member 80. In the tubular member 80, the end of the chain 102 is fastened to a cable 104. Cable 104 continues through tubular member 80 into housing 28 where it passes over a series of rollers 106, 108, 110, 112, 114, and is connected at its opposite end to a mounting post 116 on the bottom wall 34 of the housing 28.

The chain 96 is maintained in a continuous taut condition in order to urge that portion of the chain between the drum 14 and the guide 92 to comply to the form of the tire carcass T by means of the takeup device 90, which is illustrated in FIG. 7. Takeup device 90 comprises a roller 114 rotatably supporting by a mounting block 120 and is urged upwardly by means of a spring 122 having its lower end hooked to block 120 and having its upper end hung from a vertical post 124 extending downwardly from the top wall 32 of the housing 28.

For registering the displacement of compliant member 88, an indicating device 130 is provided in the carriage assembly 24. The indicating device 130 comprises a conventional register unit 132 driven by a chain belt arrangement 134. The chain belt arrangement 134 is constructed by an endless chain belt 138 trained about a pair of spaced-apart chain sprockets 140 and 142. As illustrated in FIG. 4, the lower chain sprocket 142 is rotatably supported on a mounting post 148 fastened to the bottom wall 34 of housing 28, and upper chain sprocket is rotatably supported on shaft 146 extending laterally from register unit 132, which is mounted along the upper portion of slanting front wall 36 of housing 28. Chain drive arrangement 134 is caused to move with the displacement of chain 96 by means of a fastener 150 which locks chain 138 to cable 104.

As illustrated in FIGS. 1 and 6, the register device 132 has an indicator face 154 which displays the bead-to-bead reading in inches and projects through an opening in front wall 36. It is of course necessary to calibrate the indicating device 130 to accurately measure the bead-to-bead measurement of a tire. The indicating device 130 has units, tens and hundreds cylinders 156, 157 and 158 which are driven in a conventional manner through the gear reduction arrangement 159 having the larger gear fixed to shaft 146 (FIG. 6).

To measure the outside diameter of tire carcass T, a second indicating device 160 is provided in carriage assembly 24. The second indicating assembly 160 comprises a second register unit 162 of the same type as register unit 132 driven by chain belt arrangement 164, which is constructed as an endless chain 166 trained about upper and lower chain sprockets 168 and 170, respectively. The upper chain sprocket 168 is rotatably supported from the second register unit 162 and functions to drive the same through the rotation of its shaft 174. The second register unit 162 has a display face 176 extending through an opening in front wall 36 of housing 28 to display the diameter reading. The lower drive sprocket 170 is rotatably supported on a mounting post 180, which is fastened to bottom wall 34 of housing 28.

The chain 166 is interconnected to a vertical post 182 mounted on the top wall 60 of the pedestal 12 by means of a coupler bar 184 for imparting a displacement of chain 166 in direct proportion to the movement of carriage assembly 24. Thus, the coupler bar 184 causes the chain 166 to move in a counterclockwise direction as the carriage assembly 24 moves down from the retracted position of FIG. 2 to the tire-gauging position of FIG. 3. Since the movement of the endless chain 166 in in direct proportion to the displacement of the sensor member 26 relative to the drum 14, it is possible to calibrate the register unit 166 to read the outside diameter dimension of a tire carcass T mounted on the drum 14, which is equal to the radial distance between the center of drum 14 and lower end of sensor member 26.

In the operation of the tire-measuring apparatus 10, a tire carcass T is assembled on the drum 14 with the carriage assembly 24 located in its retracted position, represented by the dotted lines of FIG. 1. The chuck 20 is radially expanded outwardly and simultaneously air is introduced under pressure to inflate the tire carcass T. As the tire carcass T is being inflated, the piston and cylinder unit 64 is energized in a direction to cause its piston rod 74 to retract inwardly and bring the carriage assembly 24 and sensor member 26 down into engagement with the crown portion of the tire carcass T. The cylinder 68 is connected to a conventional relief valve (not shown) to cause the carriage assembly to stop upon this engagement. At this time, the operator makes a reading of the bead-to-bead dimension on scale face 154 and of the outside diameter dimension on scale face 176 and records the same. After this reading is taken, a control knob provided on the pedestal 12 is actuated to reverse the operation just described, thereby permitting the ready removal of the tire carcass T and withdrawing the carriage assembly 24 to the retracted position of FIG. 1. The tire measuring apparatus is then ready for another operation.

It will be understood that suitable control means can be used to cause the simultaneous expansion of chuck 20, inflation of tire carcass and energization of piston and cylinder unit 64, and the reverse of these operations for providing a very quick and accurate measurement of the bead-to-bead and outside diameter dimensions.

We claim:

1. Apparatus for measuring the bead-to-bead length of a tire carcass that is supported on a drum, comprising a sensor member disposed radially from said drum and adapted to move radially toward and away from said drum, an elongated compliant member extending in a radial plane of said drum between one side of said drum and a point on said sensor member that is along the radial line bisecting the center of said drum, slack takeup means for maintaining said compliant member in a taut condition, means for moving said sensor member into engagement with said tire carcass, and means for measuring the displacement of said compliant member between said drum and said sensor member with said sensor member engaging said tire carcass to indicate the bead-to-bead length of said tire carcass.

2. Apparatus as defined in claim 1, further comprising a means to indicate the radial distance between the center of said drum and said sensor member when in engagement with said tire carcass to measure the outer diameter of said tire carcass.

3. Apparatus for measuring the bead-to-bead length of a tire carcass that is supported on a drum comprising a sensor member disposed radially from said drum, carriage means for conveying said sensor member radially toward and away from said drum, an elongated compliant member having one end fixed to one side of said drum, guide means carried by said sensor member for directing the length of said compliant member between said drum and said sensor member to extend from said one end along a radial plane of said drum to a point on said sensor member that is along a radial line bisecting the center of said drum, takeup means for continuously maintaining said compliant member in a taut condition, and means for measuring the displacement of said compliant member between said drum and said sensor member with said sensor member in engagement with said tire carcass to indicate the bead-to-bead length of said tire carcass.

4. The apparatus of claim 3, further comprising means actuated by the movement of said carriage means to indicate the outer diameter of said tire carcass when said sensor member engages said tire carcass.

5. The apparatus of claim 3, wherein said carriage means comprises a housing and power-operated means for moving said housing along a path parallel to said radial plane of said drum, said sensor member being supported from said housing, and wherein said means for measuring the displacement of said compliant member includes an indicator means carried by said housing calibrated to read bead-to-bead lengths, and an actuator means operated by said compliant member for driving said indicator means in direct proportion to the displacement of said compliant member.

6. The apparatus of claim 5, further comprising a second indicator means calibrated to read diameter lengths and carried by said housing, and a second actuator means mounted to a stationary member for driving said second indicator means in direct proportion to the radial distance between the center of said drum and said sensor member with said sensor member in engagement with said tire carcass.

7. Apparatus for measuring the parameters of a tire carcass that is supported on a drum, comprising a sensor member disposed radially from said drum, carriage means for conveying said sensor member radially toward and away from said drum, a length of chain having one end fixed to one side of said drum and extending to said sensor member in a radial plane of said drum, slack takeup means for continuously maintaining said chain in a taut condition, a chain sprocket mounted in the end of said sensor member about which said chain is disposed and located along a radial line bisecting the center of said drum, and means for measuring the displacement of said chain upon said chain sprocket being in engagement with the crown of said tire carcass to indicate the bead-to-bead length of said tire carcass.

8. Apparatus as defined in claim 7, wherein said carriage means comprises a housing and power operated means for moving said housing along a path parallel to said radial plane of said drum, said sensor member mounted to said housing, and wherein said means for measuring the displacement of said chain includes an indicator means carried by said housing calibrated to read bead-to-bead lengths, and an actuator means carried by said chain for driving said indicator means in direct proportion to the displacement of said chain.

9. The apparatus as defined in claim 8, wherein said indicator means comprises an endless belt supported between two rotatably mounted rollers, register means actuated by rotation of one of said rollers, and wherein said actuator means comprises a fastener coupling said endless belt to said chain.

10. Apparatus of claim 8, further comprising a second indicator means calibrated to read diameter lengths and carried by said housing, and a second actuator means mounted to a stationary member for driving said second indicator means in direct proportion to the radial distance between the center of said drum and said sensor member when said sensor member is in engagement with said tire carcass.

11. The apparatus of claim 10, wherein said second indicator means comprises an endless belt supported between two rotatably mounted rollers, register means actuated by rotation of one of said rollers, and wherein said second actuator means comprises a lever mounted on said stationary member and coupled to said endless belt.

* * * * *